US009694657B2

(12) United States Patent
Carlson

(10) Patent No.: US 9,694,657 B2
(45) Date of Patent: Jul. 4, 2017

(54) TONNEAU COVER SYSTEM FOR A CARGO BOX WITH SIDE RAIL END PLUGS WITH EXTERNAL MOUNTING EXTENSIONS

(71) Applicant: Truxedo, Inc., Yankton, SD (US)

(72) Inventor: Joel L. Carlson, Tabor, SD (US)

(73) Assignee: Truxedo, Inc., Yankton, SD (US)

( * ) Notice: Subject to any disclaimer, the term of this patent is extended or adjusted under 35 U.S.C. 154(b) by 0 days.

(21) Appl. No.: 14/948,615

(22) Filed: Nov. 23, 2015

(65) Prior Publication Data
US 2017/0144521 A1  May 25, 2017

(51) Int. Cl.
B60J 7/10 (2006.01)
B60J 7/16 (2006.01)

(52) U.S. Cl.
CPC ............. *B60J 7/1607* (2013.01); *B60J 7/102* (2013.01)

(58) Field of Classification Search
CPC .... B60J 7/10; B60J 7/102; B60J 7/104; B60P 7/04
See application file for complete search history.

(56) References Cited

U.S. PATENT DOCUMENTS

| 4,036,521 A | * | 7/1977 | Clenet ...................... B60J 7/104 296/100.15 |
| 4,042,275 A | * | 8/1977 | Glassmeyer ............. B60J 7/102 296/104 |
| 4,179,152 A | * | 12/1979 | Kent, Jr. .................. B60J 7/104 296/102 |
| 4,923,240 A | * | 5/1990 | Swanson .................. B60J 7/104 160/378 |
| 5,152,574 A | * | 10/1992 | Tucker ...................... B60P 7/04 296/100.18 |
| 5,174,353 A | * | 12/1992 | Schmeichel ............. B60J 7/104 160/328 |
| 5,584,521 A | * | 12/1996 | Hathaway ................ B60J 7/104 224/405 |
| 5,906,407 A | * | 5/1999 | Schmeichel ............. B60J 7/104 296/100.15 |
| 5,934,735 A | * | 8/1999 | Wheatley ................. B60J 7/102 296/100.01 |
| 6,024,402 A | * | 2/2000 | Wheatley ................. B60J 7/102 224/403 |
| 6,053,558 A | * | 4/2000 | Weldy ...................... B60J 7/102 160/374.1 |
| 6,126,226 A | * | 10/2000 | Wheatley ................. B60J 7/104 296/100.01 |

(Continued)

Primary Examiner — Glenn Dayoan
Assistant Examiner — Paul Chenevert
(74) Attorney, Agent, or Firm — Harness, Dickey & Pierce, P.L.C.

(57) ABSTRACT

A side rail can define an exterior and an interior channel. A coupling strip within the exterior channel of the side rail can be positioned to selectively engage with a coupling strip of a tonneau cover. An end cap can be positioned on an end of the side rail. The end cap having an end face can include an interior extension within the interior channel and an exterior tab extension within the exterior channel between the longitudinal raised side portions. A retaining fastener can extend through the exterior tab extension and can fix the end cap to the side rail without the retaining fastener passing through the coupling strip. The exterior tab extension can limit longitudinal sliding movement of the coupling strip within the exterior channel.

21 Claims, 6 Drawing Sheets

(56) References Cited

U.S. PATENT DOCUMENTS

| | | | | |
|---|---|---|---|---|
| 6,257,306 B1* | 7/2001 | Weldy | ............... | B60J 7/104 160/327 |
| 6,293,608 B1* | 9/2001 | Dicke | ............... | B60J 7/104 296/100.15 |
| 6,309,006 B1* | 10/2001 | Rippberger | ............ | B60J 7/104 296/100.16 |
| 6,568,740 B1 | 5/2003 | Dimmer | | |
| 6,575,520 B1* | 6/2003 | Spencer | ............... | B60J 7/10 296/100.01 |
| 7,445,264 B2 | 11/2008 | Spencer et al. | | |
| 7,628,442 B1* | 12/2009 | Spencer | ............... | B60J 7/104 24/455 |
| 7,828,361 B1* | 11/2010 | Spencer | ............... | B60J 7/068 296/100.16 |
| 8,573,678 B2* | 11/2013 | Yue | ............... | B60J 7/10 296/100.15 |
| 8,714,622 B2* | 5/2014 | Spencer | ............... | B60P 7/02 296/100.01 |
| 8,857,887 B1* | 10/2014 | Schmeichel | ............ | B60P 7/04 296/100.18 |
| 9,061,572 B2* | 6/2015 | Potter | ............... | B60J 7/104 |
| 9,487,070 B2* | 11/2016 | Xu | ............... | B60J 7/141 |
| 2015/0239388 A1* | 8/2015 | Potter | ............... | B60P 7/04 296/100.12 |
| 2016/0263974 A1* | 9/2016 | Xu | ............... | B60J 7/085 |

\* cited by examiner

TONNEAU COVER SYSTEM FOR A CARGO BOX WITH SIDE RAIL END PLUGS WITH EXTERNAL MOUNTING EXTENSIONS

FIELD

The present disclosure relates to tonneau cover systems for covering a cargo box, such as a pickup truck bed.

BACKGROUND

This section provides background information related to the present disclosure which is not necessarily prior art.

A tonneau cover made of a flexible material can be used to cover the box of a pickup truck or the like and to protect the contents thereof from the elements. Such a tonneau cover can be made of fabric, flexible plastic, or other sheet material. The tonneau cover can be secured to metal side rails along on the lateral sides of the cover and box with cooperating fastening strips. Because pickup trucks typically are used and stored outdoors, the fabric and the means of attachment of the fabric to the frame can be exposed to the elements which can include heavy moisture and extreme heat and cold, as well as dust, mud, rocks and other materials transported in the box.

Such exposure to the elements can create problems for the cover and supporting structure of the tonneau cover. Efforts to use releasable or selective coupling strips, such as hook and loop fasteners, for attaching the cover to the metal side rails tend to be subject to exposure to the elements and wear from repetitive use of convenient, selective attachment means under those conditions. Moreover, exposure to heat and cold can cause the tonneau cover to expand and contract, making the tonneau cover either loose or wrinkled in appearance, or making it difficult to secure the tonneau cover in the closed position. Thus, some movement between the various components of the tonneau cover system can be desired.

Tonneau cover systems employing the foregoing releasable or selective coupling strips can also suffer from a problem associated with premature engagement of the cooperating coupling elements attached to the frame and flexible cover, respectively. Premature engagement can occur in such systems as the user of the system unrolls the cover over the metal frame secured to the upper edges of the sides of a truck box or other open top container. As a result, wrinkles may appear in the flexible cover material following closure of the cover system. To remove the wrinkles, the user can be required to manually detach the strips of hook and loop-bearing material after the cover is stretched taut and then reattach them in a position that removes the wrinkles from the flexible cover. Again, some movement between the various components of the tonneau cover system can be desired.

Allowing such tonneau cover system component relative movement can result in forces that tend to push end caps off of the side rails. For example, a longitudinally sliding coupling strip can engage friction fit end cap during expansion and contraction, or tensioning of the tonneau cover, or otherwise. In contrast, attempts to positively retain the end caps with fasteners can inhibit the desired sliding movement of the coupling strip.

SUMMARY

This section provides a general summary of the disclosure, and is not a comprehensive disclosure of its full scope or all of its features.

In accordance with one aspect of the present disclosure, a tonneau cover system for covering a cargo box can include a tonneau cover having a first coupling strip extending substantially along a side thereof. A side rail can be structured for mounting to and extending substantially along a side of the cargo box. The side rail can define an exterior channel and an interior channel. The exterior channel can be defined between two opposing raised longitudinal side portions, with at least one of the raised longitudinal side portions defining a longitudinal slot. A second coupling strip can be provided within the exterior channel of the side rail and can be positioned to selectively engage with the first coupling strip. The second coupling strip can include a longitudinal side received within the longitudinal slot to slidably retain the second coupling strip within the channel. An end cap can be positioned on an end of the side rail. The end cap can include an interior extension received in the interior channel. The end cap can include an exterior tab extension received within the exterior channel between the longitudinal raised side portions, and the exterior tab extension can have an end face within the exterior channel between the raised longitudinal side portions. A retaining fastener can extend through the exterior tab extension and can fix the end cap to the side rail without the retaining fastener passing through the second coupling strip. The end face of the exterior tab extension can be positioned to engage an opposing end face of the second coupling strip within the exterior channel to positively limit longitudinal sliding movement of the second coupling strip within the exterior channel.

In accordance with another aspect of the present disclosure, tonneau cover system for covering a cargo box can include a tonneau cover having a first coupling strip extending substantially along each opposing lateral side. Two extruded side rails can be provided, and each side rail can be mounted to and can extend substantially along an opposing lateral side of the cargo box. Each side rail can define an exterior channel and an interior channel, and each channel can extend substantially along an overall longitudinal length of the side rails. The exterior channel can be defined between two opposing raised longitudinal side portions, and the raised longitudinal side portions can define opposing longitudinal slots. A second coupling strip can be provided within the exterior channel of each side rail and can be positioned to selectively engage with the first coupling strip. The second coupling strip can include longitudinal sides received within the opposing longitudinal slots to slidably retain the second coupling strip within the channel. An end cap can be positioned on an end of each side rail. The end cap can include an interior extension received within the interior channel, and the end cap can include an exterior tab extension received within the exterior channel between the longitudinal raised side portions. The exterior tab extension can have an end face within the exterior channel between the raised longitudinal side portions. A retaining fastener can extend through the exterior tab extension and can fix the end cap to the side rail without the retaining fastener passing through the second coupling strip. The end face of the exterior tab extension can be positioned to engage an opposing end face of the second coupling strip within the exterior channel to positively limit longitudinal sliding movement of the second coupling strip within the exterior channel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
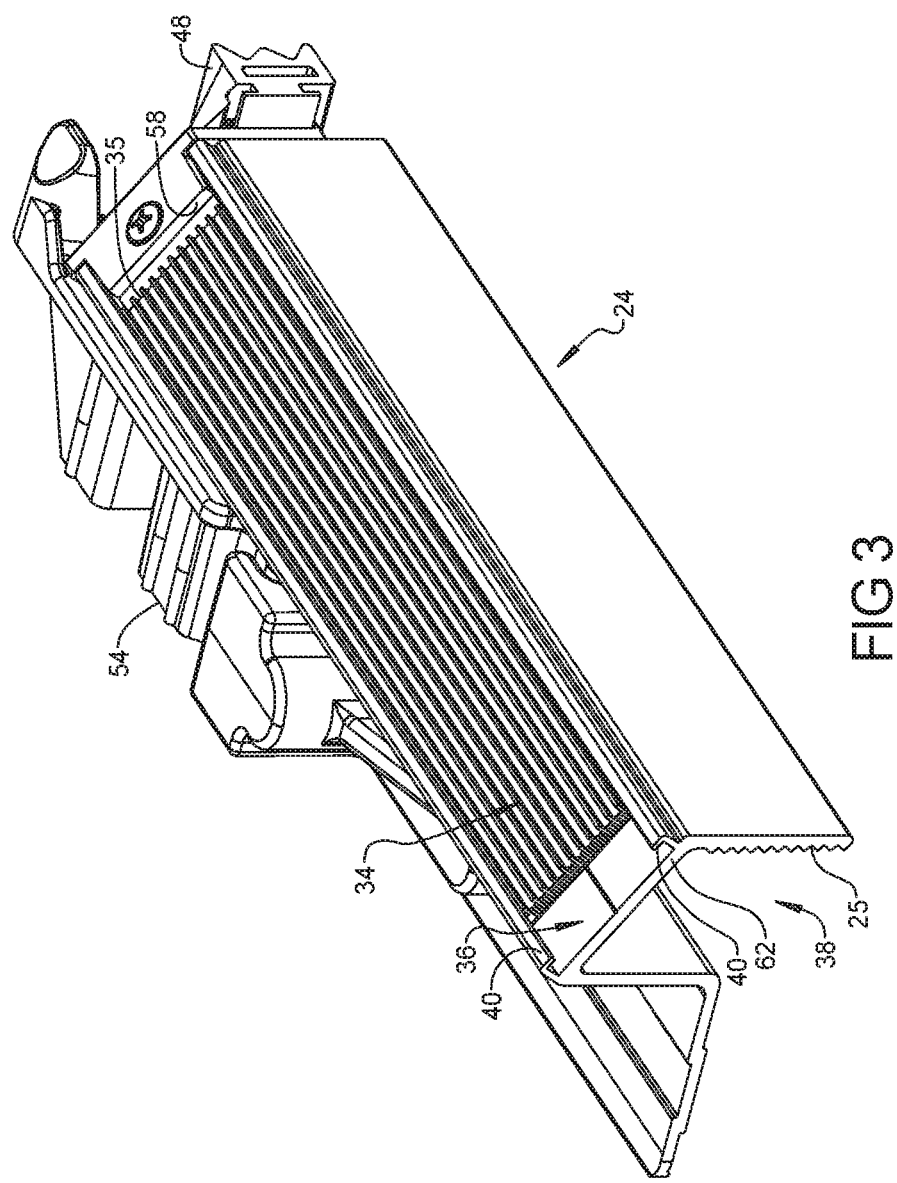
FIG. 3 is an enlarged fragmentary perspective view of an end portion of the side rail and related components of FIG. 2.
Figure 4:
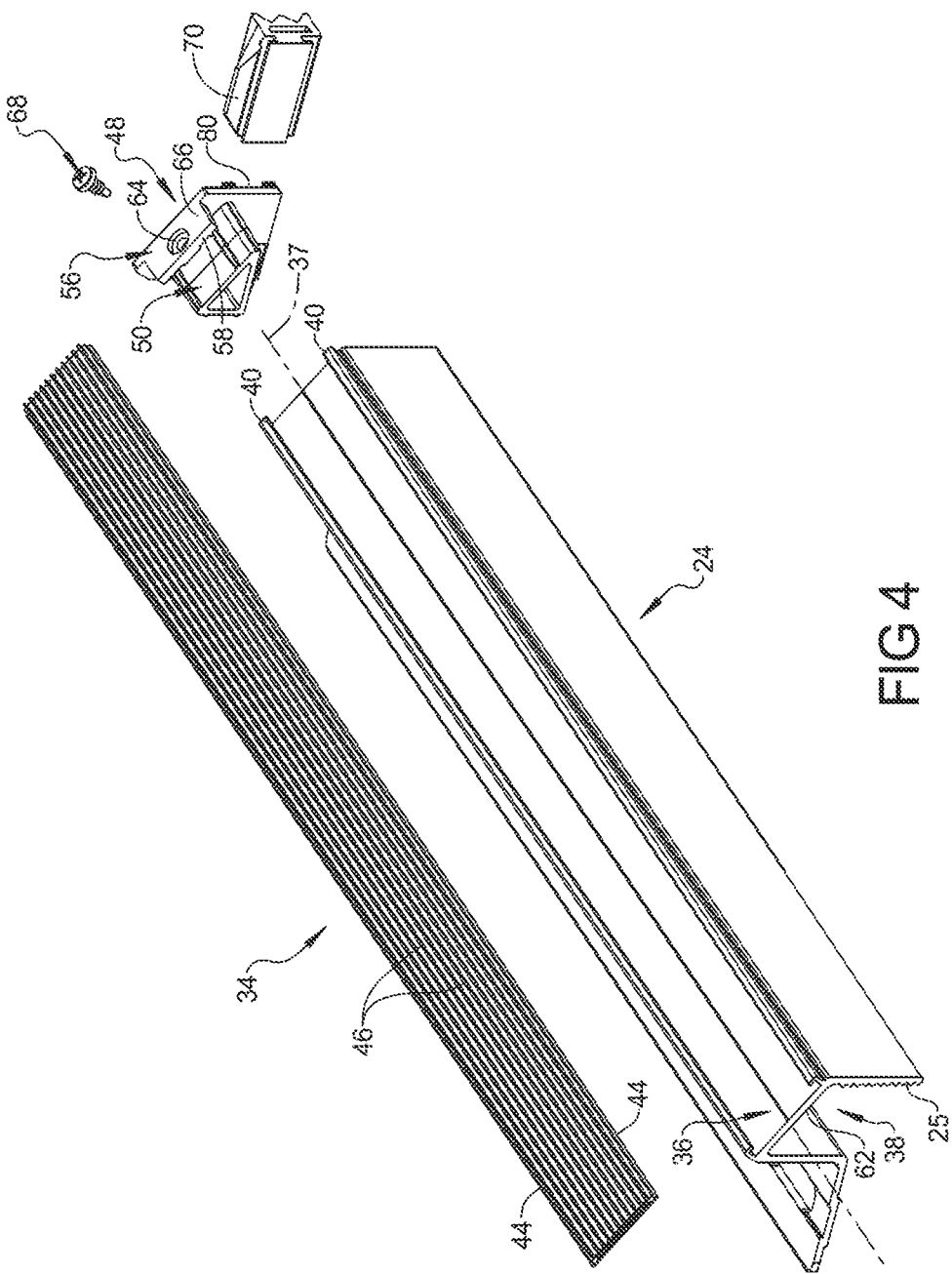
FIG. 4 is an enlarged exploded perspective view of the end portion of the side rail and related components of FIG. 3.
Figure 5:
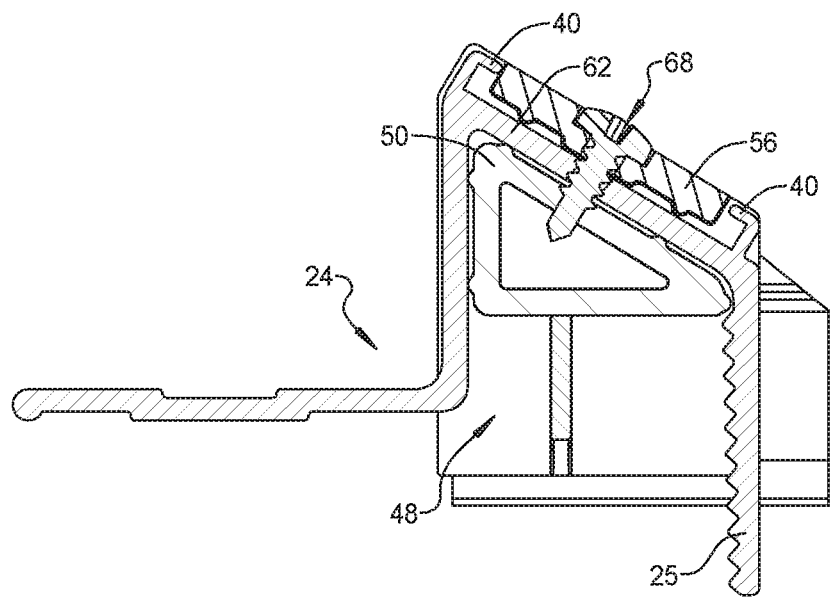
FIG. 5 is a cross-sectional view of the side rail and related components taken through the screw of FIG. 3.
Figure 6:
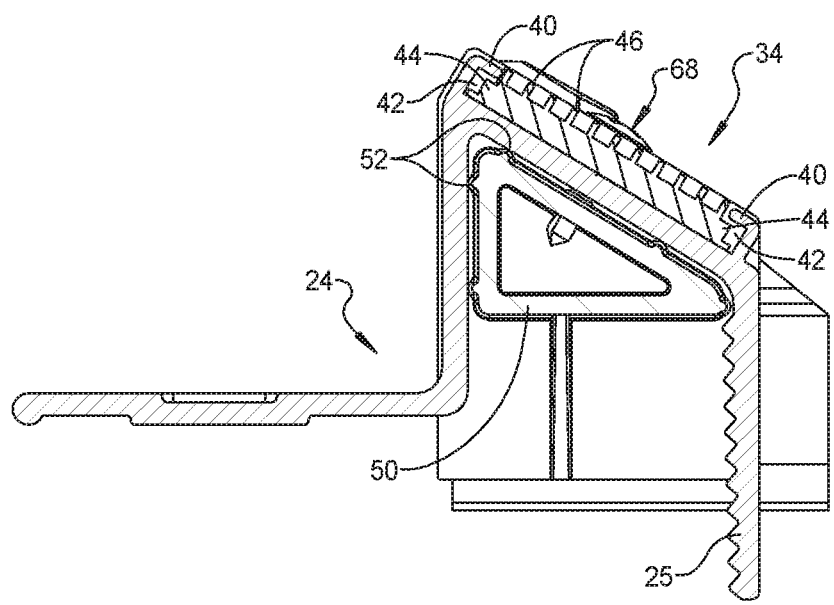

FIG. 6. is a cross-sectional view of the side rail and related components taken through a mid-point of the side rail of FIG. 3.

Figure 1:
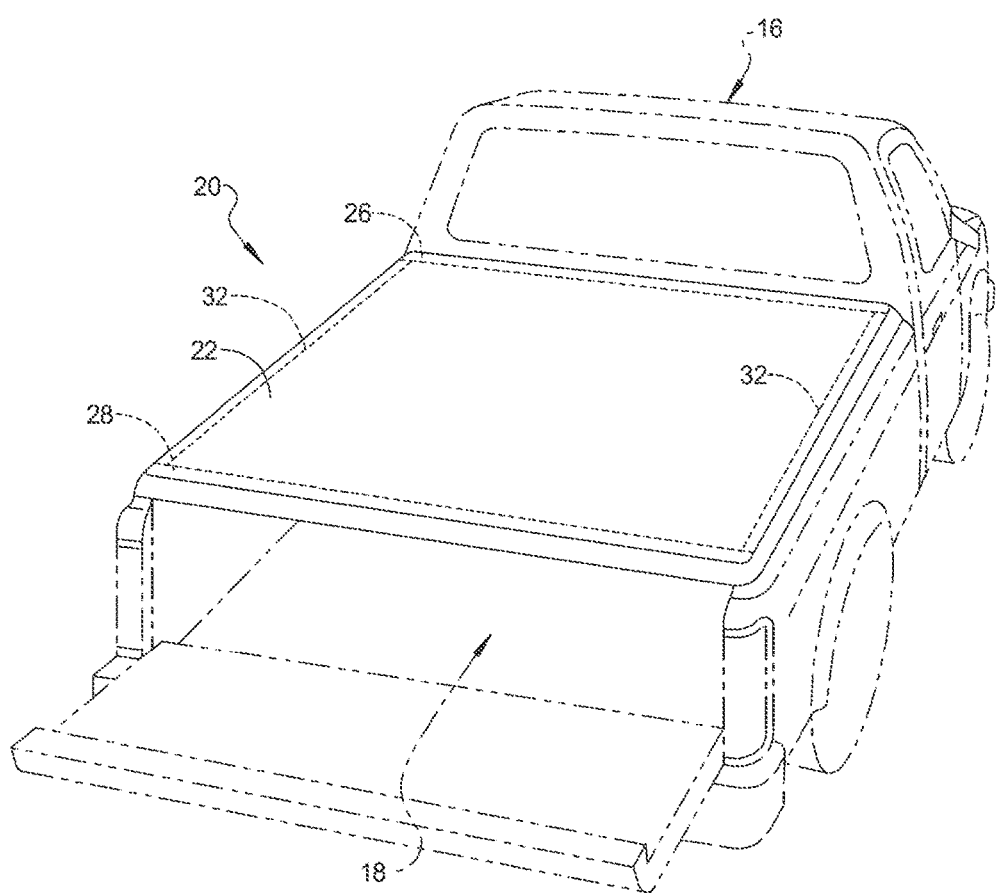
FIG. 1 is a perspective view of one exemplary embodiment of a tonneau cover system in accordance with the present disclosure with a tonneau cover deployed over the cargo box.
Figure 7:
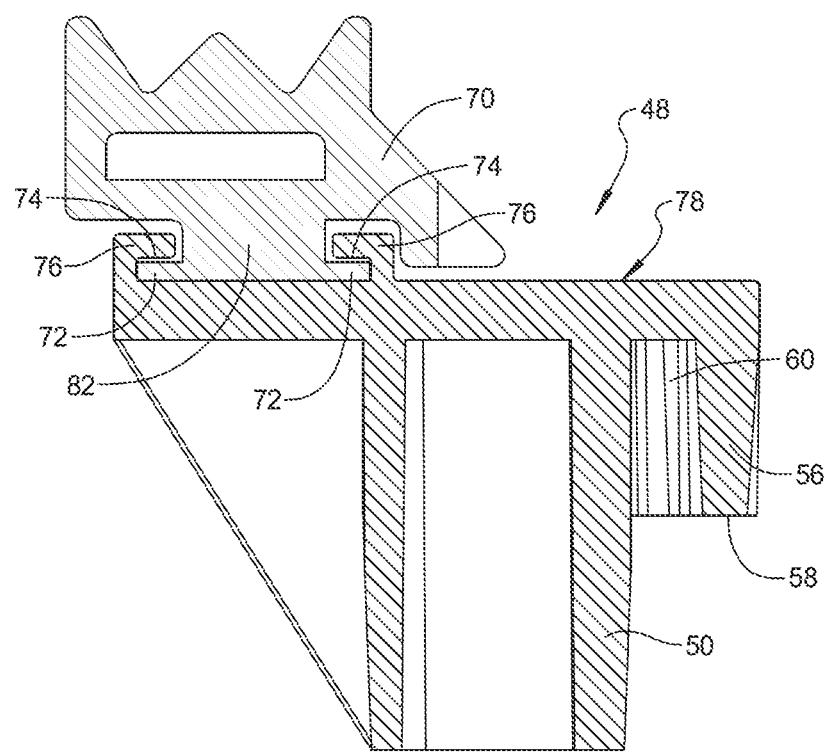

FIG. 7 is a cross-sectional view of the end cap and bumper member of the tonneau cover system FIG. 1.

Corresponding reference numerals indicate corresponding parts throughout the several views of the drawings.

DETAILED DESCRIPTION

Example embodiments will now be described more fully with reference to the accompanying drawings.

Figure 2:
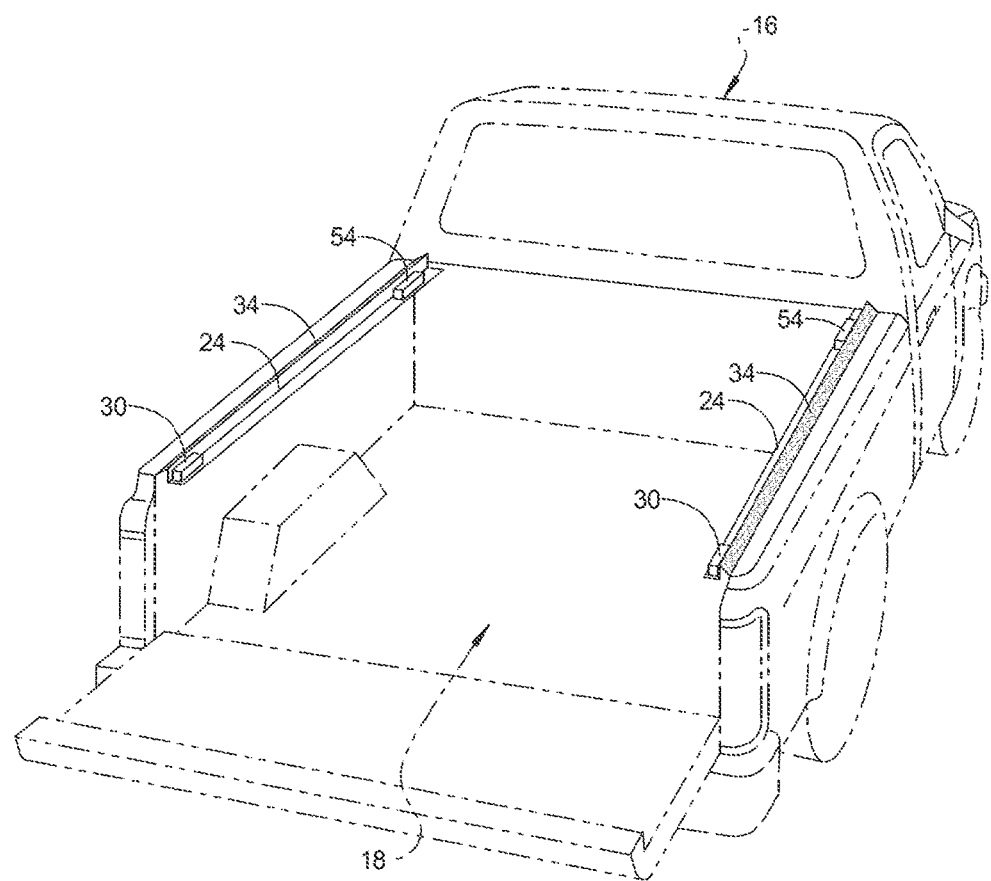
FIG. 2 is a perspective view similar to FIG. 1, but without the tonneau cover deployed over the cargo box to expose a simplified illustration of the side rails and related components of the exemplary tonneau cover system of FIG. 1.

Referring to FIGS. 1-2, an exemplary embodiment of a tonneau cover system 20 of the present disclosure for a pickup truck 16 is illustrated. Some embodiments can include a roll-up flexible tonneau cover 22 and side rails 24 that can be clamped or otherwise positioned along sides of the cargo box 18 of the pickup truck 16. The tonneau cover 22 can have a front header 26 coupled along a front edge and a rear header 28 coupled along a rear edge of the tonneau cover 22. When the tonneau cover 22 is in a deployed position over the cargo box 18, each end of the front headers 26 can be coupled to an end portion of the side rails 24.

In some embodiments, each end of the rear header 28 can be selectively coupled to one of the side rails 24 via a bracket or latch mechanism 30. Likewise, each front header 26 can be selectively coupled to one of the side rails 24 via a bracket or latch mechanism 54. One or both of the front and rear bracket mechanisms 54 and 30, respectively, can optionally include a tension adjustment mechanism to provide proper tension on the tonneau cover 22, when it is in a deployed condition with the headers 26, 28 coupled to the side rails 24.

The tonneau cover 22 can include a pair of tonneau cover coupling strips 32 with each coupling strip 32 extending along respective opposing lateral sides of the tonneau cover 22. The side rails 24 can include side rail coupling strips 34 that cooperate with the first coupling strips 32 to couple the tonneau cover 22 to the side rail 24 along opposing lateral sides of the tonneau cover 22. The side rails 24 can be mounted to and can extend substantially along the opposing lateral sides of the cargo box 18. For example, clamping members (not shown) can be provided to clamp the side rails 24 to the cargo box 18 using leg 25. As another non-limiting example, the side rails 24 can be screwed or bolted to the cargo box 18 using legs 25, or otherwise.

With additional reference to FIGS. 3-7, each side rail 24 can define an exterior channel 36. For example, the exterior channel 36 can be defined between two opposing raised longitudinal side portions 40. In some embodiments, the opposing raised longitudinal side portions 40 can include undercuts or can otherwise define opposing longitudinal slots 42.

The side rail coupling strip 34 can be mounted within the exterior channel 36 of the side rail. For example, the side rail coupling strips 34 can include longitudinal sides 44 that are received within the opposing longitudinal slots 42 to retain the side rail coupling strip 34 within the exterior channel 36. Thus, the side rail coupling strip 34 can be coupled to the side rail 24 such that it is slidable within the exterior channel 36 along a main longitudinal axis 37 thereof. This can facilitate avoiding wrinkles when the tonneau cover 22 is unrolled to its deployed position over the cargo box 18 and tensioned as both the front and rear headers 26 and 28, respectively, are coupled to the side rails 24.

In some embodiments, the active coupling elements 46 of the side rail coupling strip 34 can be provided at an upper central portion thereof. In some cases, the active coupling elements 46 are not provided along the longitudinal sides of the side rail coupling strip 34 that are received within the opposing slots 42 of the side portions 40. In some embodiments, the active coupling elements 46 can be hook or loop elements of a hook and loop fastener system. In some cases, the side rail coupling strips 34 can be a one-piece component. In other cases, the active coupling elements 46 can be formed as a separate component that is integrated with a separate base component that can include the longitudinal sides 44 of the side rail coupling strip 34 that can be received within the opposing slots 42 of the raised portions 40.

The side rails 24 can additionally define an interior channel 38. In some embodiments, the side rails 24 are each a single piece extruded member. For example, the side rails 24 can each be an extruded metal, such as aluminum, member. In some embodiments, the exterior channel 36, the interior channel 38, or both, extend substantially along an overall longitudinal length of each side rail. The cross-section of the side rail 24 can, in some cases, remain substantially uniform along the overall longitudinal length of the side rail 24.

An end cap 48 can be positioned on one or both longitudinal ends of each of the side rails 24. The end caps 48 can include an interior extension 50 and an exterior tab extension 56. In some embodiments, the end caps 48 can include a slot 60 between the interior extension 50 and an exterior tab extension 56 that can receive a wall 62 of the side rail 24.

The interior extension 50 of the end caps 48 can be received and retained within the interior channel 38. The interior extension 50 of the end cap 48 can have a plurality of sides 52. In some embodiments, each of the plurality of sides 52 can at least partially contact an adjacent side of the interior channel 38 of the side rail 24.

The exterior tab extension 56 of the end caps 48 can be received within the exterior channel 36 between the longitudinal raised side portions 40. The exterior tab extension 56 can have an end face 58 that can be at least partially received or positioned within the exterior channel 36 between the raised longitudinal side portions 40. The end face 58 of the exterior tab extension 56 can engage an opposing or adjacent end face 35 of the side rail coupling strip 34 within the exterior channel 36 to positively limit longitudinal sliding movement of the side rail coupling strip 34 within the exterior channel 36.

In some embodiments, the exterior tab extension 56 of the end caps 48 can have a recessed portion 64 in an exterior face or surface 66 that is adjacent the end face 58. The recessed portion 64 can include a preformed central through-hole, through which a retaining fastener 68 can extend. The preformed through-hole of the recessed portion 64 can act as a pilot for the fastener 68, which can facilitate correct location of the fastener 68 during manufacturing. In some embodiments, the fastener 68 can include a head that can be received within the recessed portion 64 so that at least a portion of the head of the retaining fastener 68 is recessed relative to the exterior face 66 of the exterior tab extension 56.

In some embodiments, the retaining fastener 68 can extend through the exterior tab extension 56 and through the separating wall 62 of the side rail 24 positioned within the slot 60 between the exterior tab extension 56 and the interior extension 50 and into or through the interior extension 50. Thus, a single fastener can fix both the interior extension 50 and the exterior tab extension 56 to the side rail 24. This can facilitate initial manufacturing and any subsequent removal or replacement of the end cap 48. The end cap 48 can also be formed or molded as a single piece element, without the need for costly machining.

As illustrated, the retaining fastener 68 does not extend or pass through the side rail coupling strip 34. Thus, there is no need for the side rail coupling strips 34 to include weakened areas, which might lead to premature failure thereof. Similarly, there is no need for additional manufacturing steps to form slots in the side rail coupling strips 34 to allow passage of the fastener 68 therethrough. In some cases, the retaining fastener 68 can be a threaded fastener, such as a screw.

The retaining fastener 68 can securely couple the end cap 48 to the side rail 24. Thus, the retaining fastener 68 can help resist forces that would tend to separate the end cap 48 from the side rail 24. For example, such forces on the end face 58 of the exterior tab extension 56 can result from engagement of an adjacent or opposing end face 35 of the side rail coupling strip 34 that positively limits longitudinal sliding movement of the side rail coupling strip 34 within the exterior channel 36.

In some embodiments, an end cap 48 is provided on both ends of the side rail 24, the side rail coupling strip 34 can have an overall longitudinal length that is less than a longitudinal distance between the end faces 58 of the end caps 48 mounted on the side rail 24. Thus, the side rail coupling strip 34 can slide longitudinally within the exterior channel 36, until the end face 35 of the side rail coupling strip 34 engages the opposing or adjacent end face 58 of one of the end caps 48. Because the side rail coupling strip 34 is allowed to slide, forces on the strip 34 that might otherwise damage the side rail coupling strip 34 during coupling and uncoupling with the cover coupling strips 32 are reduced. This limited sliding action can also be provided without the need for a slot in the strip 34 to receive a stop, which slot would create a weakened area that might lead to premature failure of the side rail coupling strip 34.

In some embodiments, the end cap 48 can include a protective or flexible bumper 70 at a distal end 78 thereof. As one example, the distal end 78 of the end cap 48 can include raised end cap side portions 76 that define opposing bumper mounting slots 74 and a channel between the raised end cap side portions 76. The protective bumper 70 can be coupled to the end cap 48 via a mounting extension 82 including flanges 72 that can be received within the opposing slots 74.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for covering a cargo box comprising:
    a tonneau cover having a first coupling strip extending substantially along a side thereof;
    a side rail structured for mounting to and extending substantially along a side of the cargo box, the side rail defining an exterior channel and an interior channel, the exterior channel being defined between two opposing raised longitudinal side portions, and at least one of the raised longitudinal side portions defining a longitudinal slot;
    a second coupling strip within the exterior channel of the side rail and positioned to selectively engage with the first coupling strip, the second coupling strip including a longitudinal side received within the longitudinal slot to slidably retain the second coupling strip within the exterior channel;
    an end cap positioned on an end of the side rail, the end cap including an interior extension received in the interior channel, and the end cap including an exterior tab extension received within the exterior channel between the longitudinal raised side portions, and having an end face within the exterior channel between the raised longitudinal side portions; and
    a retaining fastener extending through the exterior tab extension and fixing the end cap to the side rail without the retaining fastener passing through the second coupling strip;
    wherein the end face of the exterior tab extension is positioned to engage an opposing end face of the second coupling strip within the exterior channel to limit longitudinal sliding movement of the second coupling strip within the exterior channel.

2. The tonneau cover system according to claim 1, wherein the first and second coupling strips comprise hook and loop fasteners.

3. The tonneau cover system according to claim 1, wherein the exterior tab extension of the end cap has a preformed hole therethrough for receiving the retaining fastener, said preformed hole including a recessed portion in an exterior face adjacent the end face to receive a head of the retaining fastener.

4. The tonneau cover system according to claim 1, wherein the retaining fastener is a threaded screw.

5. The tonneau cover system according to claim 1, wherein the end cap comprises a bumper at a distal end of the end cap, the distal end including raised end cap side portions that define opposing bumper mounting slots and a channel therebetween, the bumper being coupled to the end cap via flanges received within the opposing slots.

6. The tonneau cover system according to claim 1, wherein the retaining fastener extends through the exterior tab extension and through the side rail between the exterior tab extension and the interior extension and into or through the interior extension.

7. The tonneau cover system according to claim 1, wherein each of the two opposing raised longitudinal side portions define a longitudinal slot, and wherein the second coupling strip includes two longitudinal sides, each longitudinal side being received within the longitudinal slots, respectively, to retain the second coupling strip within the channel and exposing a central active coupling element.

8. The tonneau cover system according to claim 1, wherein the side rail comprises two side rails, each of the two side rails being structured for mounting to and extending substantially along a respective opposing lateral side of the cargo box, and wherein the first coupling strip comprises two first coupling strips, each of the two first coupling strips being structured for extending substantially along a respective opposing lateral side of the tonneau cover.

9. The tonneau cover system according to claim 1, wherein the side rail is an extruded metal member.

10. The tonneau cover system according to claim 1, wherein the exterior channel and the interior channel of the side rail each extending substantially along an overall longitudinal length of the side rail.

11. The tonneau cover system according to claim 1, wherein the interior extension of the end cap has a plurality of sides, and each of the plurality of sides at least partially contacting an adjacent side of the interior channel of the side rail.

12. The tonneau cover system according to claim 1, wherein the end cap comprises two end caps, each positioned on respective opposing ends of the side rail, and wherein the second coupling strip has a length that is less than a distance between the end faces of the end caps.

13. The tonneau cover system according to claim 1, wherein the second coupling strip is slidable within the exterior channel along a main longitudinal axis of the exterior channel.

14. A tonneau cover system for covering a cargo box comprising:
    a tonneau cover having a first coupling strip extending substantially along each opposing lateral side;
    two extruded side rails, each side rail being mounted to and extending substantially along an opposing lateral side of the cargo box, each side rail defining an exterior channel and an interior channel each extending substantially along an overall longitudinal length, the exterior channel being defined between two opposing raised longitudinal side portions, and the raised longitudinal side portions defining opposing longitudinal slots;
    a second coupling strip within the exterior channel of each side rail and positioned to selectively engage with the first coupling strip, the second coupling strip including longitudinal sides received within the opposing longitudinal slots to slidably retain the second coupling strip within the exterior channel;
    an end cap positioned on an end of each side rail, the end cap including an interior extension received within the interior channel, and the end cap including an exterior tab extension received within the exterior channel between the longitudinal raised side portions, the exterior tab extension having an end face within the exterior channel between the raised longitudinal side portions; and a retaining fastener extending through the exterior tab extension and fixing the end cap to the side rail without the retaining fastener passing through the second coupling strip;

wherein the end face of the exterior tab extension is positioned to engage an opposing end face of the second coupling strip within the exterior channel to limit longitudinal sliding movement of the second coupling strip within the exterior channel.

15. The tonneau cover system according to claim 14, wherein the first and second coupling strips comprise hook and loop fasteners.

16. The tonneau cover system according to claim 14, wherein the exterior tab extension of the end cap has a preformed hole therethrough for receiving the retaining fastener, said preformed hole including a recessed portion in an exterior face adjacent the end face to receive a head of the retaining fastener.

17. The tonneau cover system according to claim 14, wherein the retaining fastener is a threaded screw.

18. The tonneau cover system according to claim 14, wherein the end cap comprises a bumper at a distal end of the end cap, the distal end including raised end cap side portions that define opposing bumper mounting slots and a channel therebetween, the bumper being coupled to the end cap via flanges received within the opposing slots.

19. The tonneau cover system according to claim 14, wherein the retaining fastener extends through the exterior tab extension and through the side rail between the exterior tab extension and the interior extension and into or through the interior extension.

20. The tonneau cover system according to claim 14, wherein the end cap comprises a plurality of end caps, each positioned on respective ends of each side rail, and wherein the second coupling strip has a length that is less than a distance between the end faces of the end caps.

21. The tonneau cover system according to claim 20, wherein the second coupling strip is slidable within the exterior channel along a main longitudinal axis of the exterior channel between the end faces of a pair of the plurality of end caps.

* * * * *